US006080955A

United States Patent [19]

Schwankhart

[11] Patent Number: 6,080,955

[45] Date of Patent: Jun. 27, 2000

[54] PLASMA PRODUCER WITH A HOLDER

[75] Inventor: Gerhard Schwankhart, Attnang-Puchheim, Austria

[73] Assignee: Inocon Technologie Gesellschaft m.b.H., Attnang-Puchheim, Austria

[21] Appl. No.: 09/228,989

[22] Filed: Jan. 12, 1999

[30] Foreign Application Priority Data

Jan. 28, 1998 [AT] Austria .................................. A135/98

[51] Int. Cl.[7] ...................................................... B23K 9/00

[52] U.S. Cl. ................................ 219/121.48; 219/121.63

[58] Field of Search ......................... 219/121.48, 121.63, 219/121.75, 137.63; 118/723 DC

[56] References Cited

U.S. PATENT DOCUMENTS

| | | | |
|---|---|---|---|
| 4,582,979 | 4/1986 | Moerke | 219/137.63 |
| 4,590,354 | 5/1986 | Marhic ert al. | 219/121.48 |
| 4,939,339 | 7/1990 | Folkening et al. | 219/137.63 |
| 5,214,262 | 5/1993 | Carkhuff | 219/121.48 |
| 5,258,599 | 11/1993 | Moerke . | |
| 5,328,516 | 7/1994 | Dietiker | 118/723 DC |
| 5,451,739 | 9/1995 | Nemchinsky et al. | 219/121.51 |
| 5,624,586 | 4/1997 | Sorbr et al. | 219/121.48 |
| 5,681,489 | 10/1997 | Carkhuff | 219/121.48 |
| 5,874,707 | 3/1999 | Iida et al. | 219/121.48 |

FOREIGN PATENT DOCUMENTS

| | | |
|---|---|---|
| 0079019 | 5/1983 | European Pat. Off. . |
| 0599709 | 6/1994 | European Pat. Off. . |
| WO91/04122 | 4/1991 | WIPO . |

*Primary Examiner*—Teresa Walberg
*Assistant Examiner*—Quang Van
*Attorney, Agent, or Firm*—Collard & Roe, P.C.

[57] ABSTRACT

A device with a plasma producer with a chamber (27, 27') which is connected with a gas connection and is penetrated by a cathode (19, 19'), and an anode (15, 15') encompassing the cathode (19, 19') with an annular gap, with the annular gap being in connection with the chamber (27, 27') and the anode (15, 15') and the cathode (19, 19') being in connection with the electric connection lines (6). In order to allow a simple exchange of the plasma producer it is provided that the cathode (19, 19') is held in a holding part (18, 18') made of an electrically well-conducting material, and that the holding part (18, 18') and the anode (15, 15') as well as an intermediate part (17, 55) which is arranged between the holding part (18, 18') of the cathode (19, 19') and the anode (15, 15') and which delimits the chamber (27, 27') are jointly connected with at least one connecting part (13, 87) into a module (11, 11') which can be handled as a unit, with the holding part (18, 18') and the anode (15, 15') being in an electrically conducting connection with the contact surfaces which cooperate with the contact pins (9, 9') which are connected with electric connection lines (6) and are held displaceable in an axially resilient manner in a holder (1, 1').

12 Claims, 5 Drawing Sheets

PLASMA PRODUCER WITH A HOLDER

BACKGROUND OF THE INVENTION

1. Field of the Invention

The invention relates to a plasma producer with a holder, e.g. for a welding device.

2. Description of the Prior Art

In plasma producers of known devices the cathode and anode are usually connected to connecting cables wish clamping joints and mechanically connected with one another by way of respective range spacers which also determine the chamber through which a respective gas is supplied to the arc burning between the anode and cathode.

As a result of the unavoidable wear of the cathode, it must be reworked after a certain number of working hours. For this purpose it is necessary to disassemble the plasma producer and to re-grind the cathode. Then it is necessary to adjust the cathode with respect to the anode with extreme precision again in order to be able to perform the intended working of a work piece such as the application of a weld seam or the application of a metal layer. This adjusting work requires a considerable amount of time and causes considerable standstill periods of the tool and thus production losses.

For this reason laser or electron-beam devices are used in mass production for different tasks, e.g. for welding or cutting, although they are considerably more expensive in production than devices that work with plasma, e.g. welding devices, and the required preparation for the work pieces to be welded is considerably higher since laser and electron beams can produce heat only by absorption, but do not radiate any heat themselves as is the case with plasma.

From U.S. Pat. No. 5,258,599 A and EP 0 079 019 A1 devices are known for example in which plasma producers are provided which work with consumable cathodes and in which the anodes plus holders are arranged as a module and can be handled together. This module can be removed from a holder which also comprises the fixing device or guide means for the consumable cathode.

In these known solutions an axial supply of the cathode and also the supply with gas is provided and the connection of the electric power supply also occurs in the axial direction of the chamber.

This leads to the disadvantage, however, that the plasma producer has a very large overall length. As the plasma producer is usually clamped in a receptacle of a welding robot at its end zone which is averted from the nozzle orifice, there will be respectively large imprecisions in the guidance of the orifice of the nozzle which is decisive for the success of the working and the reproduceability as a result of the unavoidable tolerances, in particular after changing the module.

Moreover, for currents of more than 1000 A plasma producers have very large diameters and thus have very large masses. Furthermore, cross sections of the paths of the current which are required for such currents can hardly be achieved, so that it is necessary to work with respectively high current densities, which leads to a respective heating of the current-carrying parts.

The close distance of the current-bearing parts, which is unavoidable in such axially divisible plasma producers in the case of slender designs, leads in the case of high ignition voltages which are required in particular in case of an operation with helium gas to internal arc-overs and thus to ignition failures.

SUMMARY OF THE INVENTION

It is the object of the present invention to avoid such disadvantages and to provide a device with which a substantially continuous use is possible with high reproduceability of the settings even after an exchange of the module. This is achieved in accordance with the invention by a device which comprises, in combination, a plasma producer and a holder detachably receiving the plasma producer, the plasma producer comprising a non-consumable cathode passing through a chamber and an annular anode having a bore coaxially aligned with the cathode and enclosing an end of the cathode, the cathode end and the annular anode defining a gap therebetween to form a nozzle, and the nozzle and the chamber being in communication with each other, a holding part made of an electrically well-conducting material holding the cathode in the plasma producer, the holding part and the annular anode having electrically conducting contact surfaces, an intermediate part made of an electrically insulating material delimiting the chamber, and a connecting part holding together the cathode held in the holding part, the anode and the intermediate part to form a module that may be handled as a unit. The holder comprises a gas supply line extending in an axial direction of the holder substantially perpendicularly to the axis of the cathode and the gas supply line being coaxial with a radially extending inlet of the chamber when the module is received on the holder, contact pins resiliently displaceable in the axial direction of the holder for electrical contact with the electrically conducting contact surfaces of the holding part and the annular anode when the module is received on the holder, electrical connecting lines connected to the contact pins, and detachable fastening means for receiving the module.

As a result of the proposed measures it is possible in a very simple way to exchange the plasma producer which is arranged as a module. For this purpose it is fully sufficient to remove the module from the holder and to exchange it for a new one. In this process the previously required disassembly of the connecting lines can be omitted, as the same are connected with the contact pins arranged in the holder.

During the production of the modules the cathode can be set in an optimized manner for the intended use and can be fixed in its position. The latter can occur in any desirable manner. In plasma producers of lower output, the cathode can be connected in an operatively undetachable manner with the holding part by means of soldering, for example.

As a result of the radial connections for the power and gas supply it is possible to achieve a very compact design of the module. It can be kept very short in comparison with conventional solutions. Moreover, electric connections with relatively large cross sections can be provided without thus leading to very voluminous modules. Respectively large distances between the electrically conductive parts can be provided, so that there will also not be any problems at higher ignition voltages.

As a result of the alignment of the holder perpendicular to the nozzle axis of the plasma producer, a very rigid and secure fixing of the module is also possible in a very simple manner, thus ensuring a precise guidance of the orifice of the same.

According to one preferred embodiment, the annular anode is conically enlarged adjacent the nozzle, the intermediate part defining the radially extending inlet and having opposite end faces, an end face of the annular anode resting on one of the end faces of the intermediate part and an end face of the holding part resting on the opposite end face of the intermediate part, a pressure part made of an electrically insulating material rests on the holding part, the connecting part made of an electrically insulating material enclosing the parts, and a lid is screwed on the connecting part and pressing against the pressure part. This leads to a very simple solution in respect of manufacturing technics, which is particularly suitable for lower outputs. Such a plasma producer can be designed as an expendable element which is supplied to recycling after use.

A very simple arrangement of the holder, with the contact pins ensuring the securing of the module in the axial direction is obtained if the holder comprises a bow for receiving the module, the contact pins engaging radial bores in the connecting part when the module is received in the bow for securing the axial position of the module, and the connecting part has a further radial bore coaxial with the radially extending inlet to the chamber when the module is received on the holder.

For devices with more powerful plasma producers coolant chambers it is useful to provide the characterizing features of claim 4.

As a result of the proposed measures it is also possible to exchange the plasma producer in a simple and rapid manner. This simultaneously also leads to a very simple arrangement of the module, with the possibility also being given to detach the cathode from the collet after the disassembly of the module and to re-grind it. It is thus also possible, in order to better utilize the cathode, to form its two end areas in a conical manner, with the cone angle being adapted to the respective application.

The adjustment of the cathode can be performed after reworking the cathode with a setting gauge adapted to the respective purpose or application of the module. As such a re-working of the cathode can occur after the exchange of the entire module, such work does not entail any substantial interruptions of the production such as in a production line, for example.

It is advantageous to provide a very precise guidance of the cathode. It is simultaneously also important to ensure that an arc can only burn between the orifice of the anode and the face side of a centering sleeve which is closest to the same and thus only in a very narrowly limited area. This also ensures a very controlled operation of the plasma producer.

In order to increase the service life of the anode, the a tungsten alloy insert may be soldered into the orifice of the anode.

Preferably, the anode may be exchanged in a very simple way, e.g. when it is respectively used up or when it is useful for a specific application of the device or when for certain work another geometry of the anode is required.

A very simple arrangement is obtained if the coolant chambers are interconnected, as for each coolant chamber only one duct leading to a connection opening is required.

Preferably, the coolant chamber is completely flowed through in the zone of the anode, thus preventing any region of silence.

For a simple arrangement of the device, and of the holder in particular, it is preferable to provide hollow contact pins. As a result, the contact pins for the provision of the electric connection can be used simultaneously for the supply of the coolant.

It is advantageous to ensure an even flow with gas against the cathode in the zone of the chamber.

To securely prevent any change of the axial position of the cathode with respect to the anode during the tightening of a collet holding the cathode, a tightening nut having a continuous screw thread and a stop screwed into the tightening nut and projecting into the collet may be provided, the cathode resting on the stop and the stop being fixable in position by the nut. During the re-working it is easily possible to determine its change of length as compared with the previous setting and the stop can be turned further into the tightening nut by the respective amount and can be secured in this position.

BRIEF DESCRIPTION OF THE DRAWING

The invention is now explained in closer detail by reference to the drawings, wherein.

DETAILED DESCRIPTION OF PREFERRED EMBODIMENTS

Figure 1:
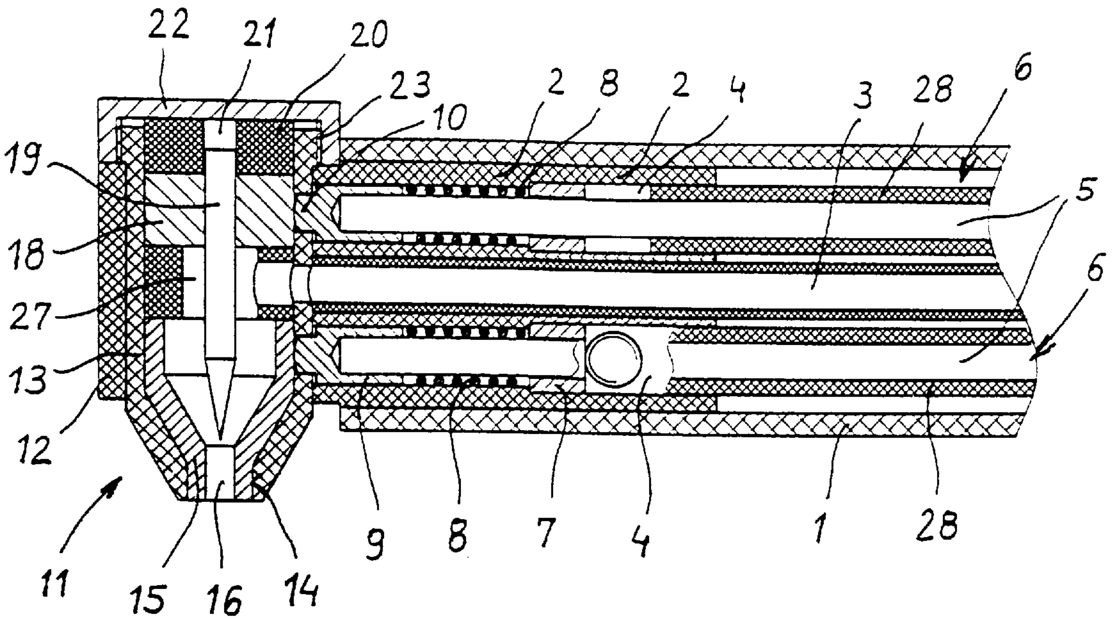
FIG. 1 schematically shows a sectional view through a holder with a plasma producer of a device in accordance with the invention.
Figure 2:
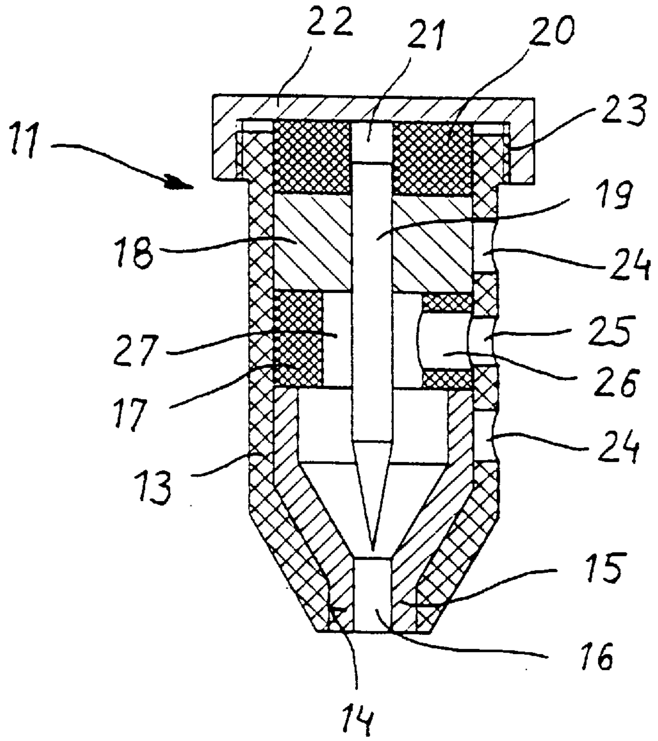
FIG. 2 shows a sectional view on an enlarged scale through the plasma producer pursuant to FIG. 1.

In the embodiment pursuant to FIGS. 1 and 2 there is provided a substantially hollow-cylindrical holder 1 which is made of an electrically insulating material such as ceramics and in whose end zone there is pressed in an insert 2 which is also made of an insulating material.

Said insert 2 is penetrated by a central tube which forms a gas supply line 3 and ends on the face side of the insert 2 projecting beyond the face side of holder 1. Furthermore, the insert 2 is provided with two bores 4 which are disposed in a diametrical plane and in which pressed-in parts 7 are held which act as abutments and are penetrated on their part by the cores 5 of connecting lines 6 with play.

These connecting lines 6 are connected to a power supply (not shown) which is capable of supplying the ignition pulses required for the ignition of the plasma in addition to the working current required for the work to be performed.

Pressure springs 8 rest on these pressed-in parts 7, which springs outwardly press the contact pins 9 which are soldered together with the cores 5. The contact pins 9 are provided at their free end with a face-sided nose 10 which co-operates with a contact surface of a plasma producer 11 which is held in a fastening device 12 which is arranged in the face side of holder 1 and is arranged as a bow which is made of an electrically insulating material and in which the plasma producer 11 is inserted from above.

This plasma producer 11 is provided with a connecting part 13 which is made of an electrically insulating material such as ceramics and is arranged in its lower zone in a conically tapering manner and is provided at its lower face side with an opening 14.

This opening 14 is penetrated by an annular anode 15 which is produced in the conventional manner from an electrically conductive and thermally highly stable material and is provided in its orifice region with a nozzle aperture 16.

Anode 15 is provided with an upwardly conically expanding zone which rests inwardly on the connecting part 13 and changes into a cylindrical zone.

An intermediate part 17 rests on the upper face side of anode 15, which part is arranged annularly and is made of an electrically insulating material such as ceramics.

A holding part 18 which is made from an electrically well conducting material such as copper rests on the upper face side of intermediate part 17. A cathode 19 is pressed into said holding part which is made from an electrically conducting and thermally highly stable material such as a tungsten and cerium oxide alloy and is shaped in a conical manner in its end zone close to the nozzle aperture 16 of anode 15.

In order to determine the mutual position of the cathode 10 and the nozzle aperture 16 of the anode, the anode 15 as well as the holding part 18 are favourably fitted into the connecting part 13.

The anode 15, the intermediate part 17 and the holding part 18 with the pressed-in cathode 19 jointly form with the connecting part 13 a module of the device which be easily installed in the holder and removed from the same again.

A pressure part 20 made from an insulating material rests on the upper face side of the holding part 18, which pressure part is provided with a bore 21 which receives a cathode 19 with play and projects beyond the face side of the connecting part 13.

This pressure part 20 co-operates jointly with a lid 22 which is screwed onto an outside thread 23 which is arranged in a zone close to the upper face side of the connecting part 13.

The connecting part 13 is provided with three radial bores 24, 25 which are arranged along a generatrix, of which bores 24 allow the passage of the noses 10 of the contact pins 9 and are arranged in the zone of the holding part 18 or anode 15. Bore 25 is arranged in the zone of the intermediate part 17 and is coaxial with a radially extending inlet 26 of the intermediate part which leads to a chamber 27 which is delimited by the inner wall of intermediate part 17 and is penetrated by cathode 19.

When the plasma producer which is arranged as a module is inserted in holder 1, bore 25 is also coaxial with the gas supply line 3 which is provided in holder 1.

For building in the plasma producer 11 which is arranged as a module it is sufficient to withdraw the connecting lines 6 whose insulating sheaths 28 are guided with play in the bores 4 of the insert 2 of holder 1 and to insert the plasma producer 11 from above in the bow 12. Thereafter the connecting lines 6 can be released and the contact pins 9 will latch into the bores 24 of the connecting part 13 and will secure the position of the plasma producer 11 in holder 1. Simultaneously, they are pressed with their face sides against the holding part 8 or anode 15 by means of spring 8 and a favourable electric contact is thus produced.

During the operation of the plasma producer 11 a gas such as helium, $CO_2$ or the like is introduced into chamber 27 by way of the gas supply line 3, which gas sweeps around cathode 19 and simultaneously cools the same in operation. This gas flows through nozzle aperture 16.

If an arc is ignited by means of a high voltage pulse between anode 15 and the cathode 19, a plasma is formed which emerges from the nozzle aperture 16 and can be used for producing a weld seam or for cutting materials for example.

If the cathode 19 or its conical end zone is worn off to such an extent that a proper operation of the plasma producer is no longer ensured, the plasma producer 11 arranged as a module is simply exchanged and replaced by a new one. The exchanged plasma producer 11 can then be supplied to a recycling process.

Figure 3:
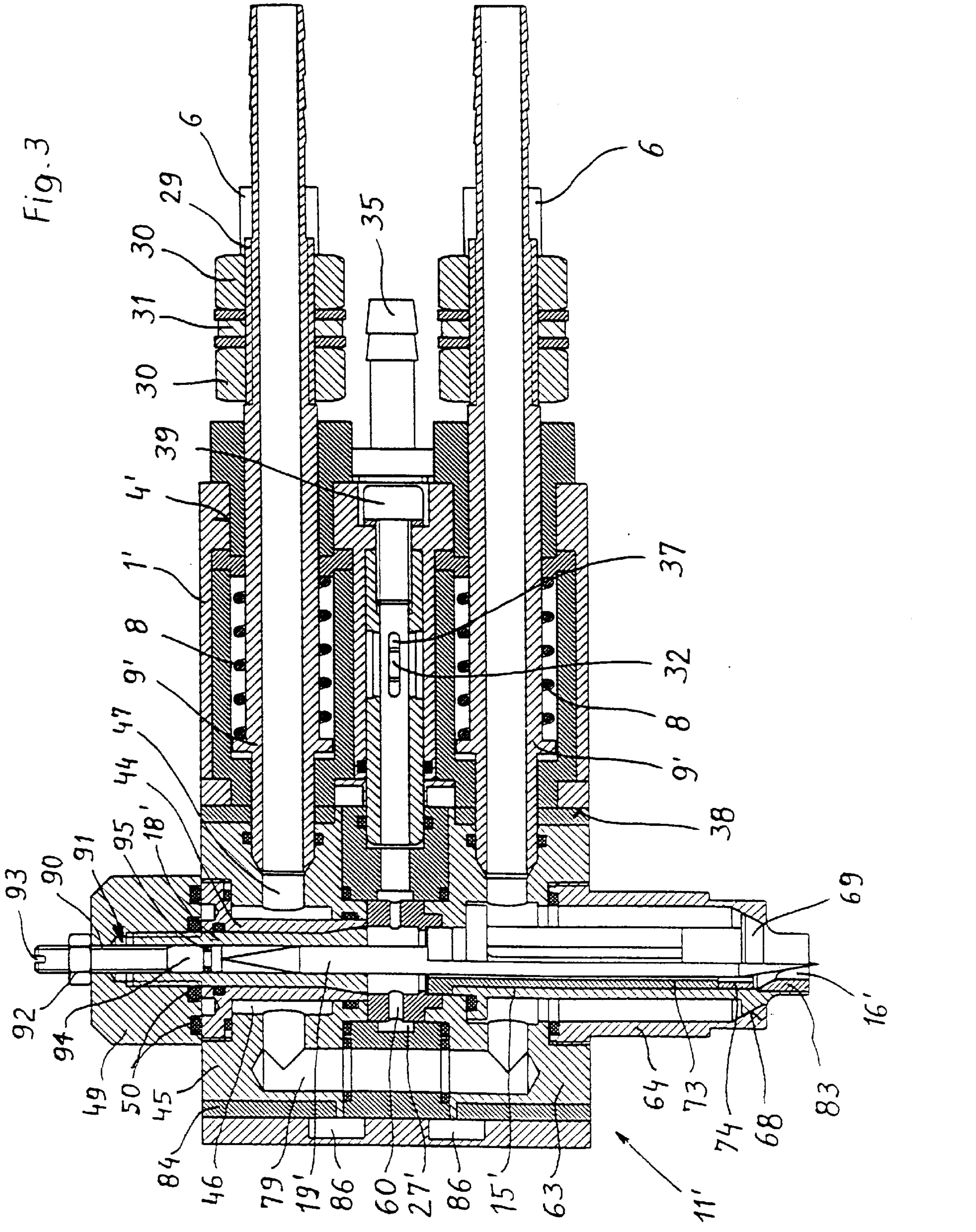
FIG. 3 shows a sectional view through a further embodiment of a holder with a plasma producer in accordance with a further embodiment of a device in accordance with the invention.

In the embodiment pursuant to FIG. 3 a holder 1' is provided which comprises bores 4' for receiving the contact pins 9', with the contact pins 9' being bored through in the axial direction. The contact pins 9' are provided with an outer thread 29 in a zone disposed outside of the holder 1'. Terminal nuts 30 are screwed onto said outer thread, between which cable lugs 31 of connecting lines 6 (FIG. 4) are clamped.

The rear end of contact pins 9' is arranged for the connection of tubes through which cooling water can be supplied.

Figure 4:
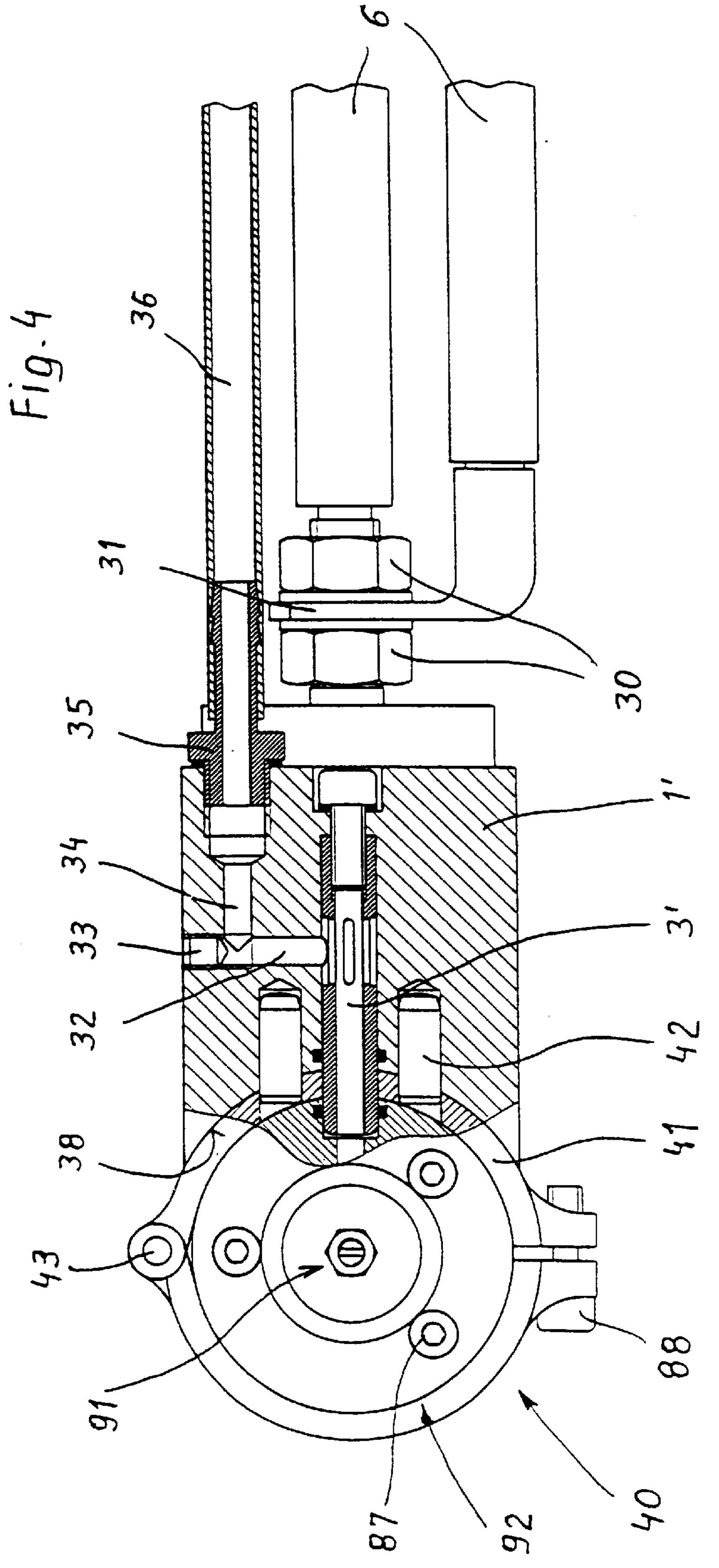
FIG. 4 shows a top view of the holder including plasma producer in accordance with FIG. 3.
Figure 5:
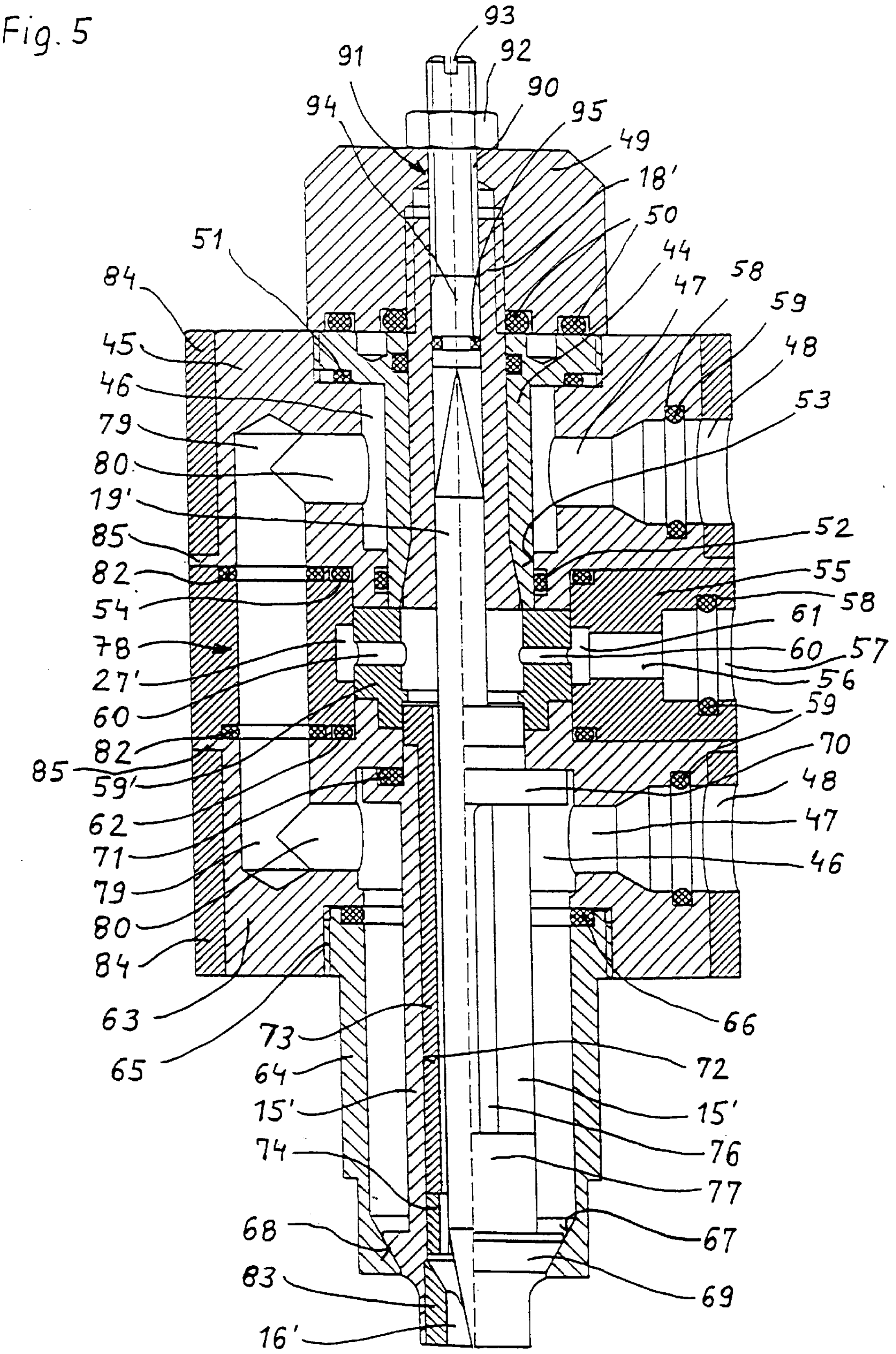
FIG. 5 shows a sectional view through the plasma producer in accordance with FIGS. 3 and 4 on an enlarged scale.

Furthermore, a gas supply line 3' is held in holder 1' which, as is shown in FIG. 4, is connected with a gas tube 36 via a radial duct 32 which is outwardly occluded with a stud screw 33 and an axial bore 34 which opens into the same and in which a hose liner 35 is screwed into. A gas required for the production of the plasma can be supplied through said gas tube 36.

The gas supply line 3' is provided in the zone of the radial duct 32 with slots 37 through which the gas can flow into the interior of the gas supply line 3'. The gas supply line 3' is secured in its position by means of a screw 39 engaging in the same.

As can be seen from FIG. 3, the contact pins 9' project in their spring-loaded idle position beyond the face surface 38 of the holder 1' and engage into the surface area of a plasma producer 11' arranged as a module. The same also applies to the gas supply line 3' which engages into the same when the plasma producer 11' is mounted.

The plasma producer 11' which is designed as a module is held by means of a pipe clamp 40 whose rigid part held on the face side 38 of holder 1' is held with pins 42. The pipe clamp 40 is provided with a joint 43 whose axis extends perpendicular to the axis of holder 1'.

In plasma producer 11' the holding part 18' of the cathode 19' is formed by a collet which is made from an electrically well-conducting material. Said collet is held in the usual manner in a receiver 44 which is screwed into a contact part 45.

Said contact part 45 is provided with a coolant chamber 46 which is connected with the connecting opening 48 by way of a radial duct 47. Said connecting opening 48 is coaxial with the contact pins 9' when plasma producer 11' is mounted in the holder 1'.

For tightening and detaching the collet 18' a tightening nut 49 is provided which rests on the upper face side of the receiver 44 by way of two seals 50, as a result of which any escape of coolant is prevented. The receiver 44 also rests on contact part 45 by way of a seal 51 in order to seal the coolant chamber 46.

For further sealing the coolant chamber of the contact part 45 there is provided on O-ring 52 which is inserted in a groove of a bore 53 which is penetrated by receiver 44.

To secure the axial setting of the cathode 19' during the tightening of the collet 18', the tightening nut 49 is provided with a continuous screw thread 90 in which a stop 91 is screwed in which engages in the collet 18' This stop 91 is provided with a smooth head 94 in which a circular groove is incorporated for receiving an O-ring 95 which is used for sealing the interior of the collet 18'.

To secure the position of stop 91 which is adjustable by a screw driver inserted into the face-sided slot 93, a counternut 92 is provided which simultaneously ensures a torsionally rigid connection between the stop 91, on which cathode 19' rests, and the tightening nut 49.

As a result of stop 91 it is ensured that during the tightening of the collet the cathode 19' can no longer be axially moved with respect to anode 15' by the collet 18' because the tightening nut 49 rests on the face side of the contact part 45 and anode 15' is fixed with respect to the same.

The contact part 45 which is used for establishing contact with the cathode 19' rests on an intermediate part 55 by interposing a seal 54, which intermediate part is made from an electrically insulating material such as ceramics. Said intermediate part 55 determines the chamber 27' which is connected via a radial duct 56 with a connecting opening 57.

The radial ducts 47 and 56 are provided with circular grooves 58 in which O-rings 59 are arranged. They are used for sealing the contact pins 9' or the gas supply line 3' which engage in said ducts.

Chamber 27' comprises a distribution ring 59 which is provided with bores 60 which are arranged in a distributed manner over the circumference and whose diameter increases with increasing angle in both rotational directions with respect to the radial duct 56. The axial bore of the distribution ring 59 is penetrated by cathode 19'. An annular space 61 remains between the inner wall of the intermediate part 55 and the distribution ring 59.

The intermediate part 55 rests on a contact part 63 of the anode by way of a seal 62. A clamping sleeve 64 is screwed into an internal screw thread 65 in this contact part 63 of the anode, with a seal 66 being interposed between the contact part 63 of the anode and the face side of the clamping sleeve 64.

The clamping sleeve 64 is provided in the zone of its one end with a conical bearing surface 67 on which rests a diametrically opposed conical surface area 68 of a head 69 of an anode 15' which, like the clamping sleeve 64 and the contact part 63 of the anode, is made from an electrically well-conducting material.

Anode 15 rests with a further head 70 at its end averted from head 69, which further head rests on a shoulder of the contact part 63 of the anode by interposing a seal 71. Anode 15' penetrates a coolant chamber 46 of the contact part 63 of the anode.

Anode 15' is bored through in the axial direction. A sleeve 73 made from an elecrically insulating material such as ceramics is inserted in said bore 72 and is penetrated by the cathode 19'.

Figure 7:
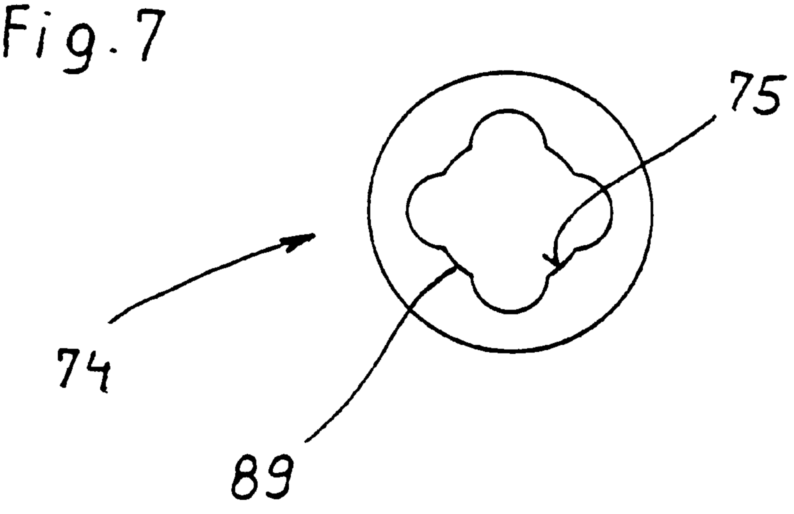

Furthermore, a centering sleeve 74 is inserted in the bore 72 in the zone which is close to the anode 15', which sleeve is shown in closer detail in FIG. 7 and whose guide surfaces 75 which are provided on guide ribs 89 rest on the surface area of cathode 19'.

Figure 6:
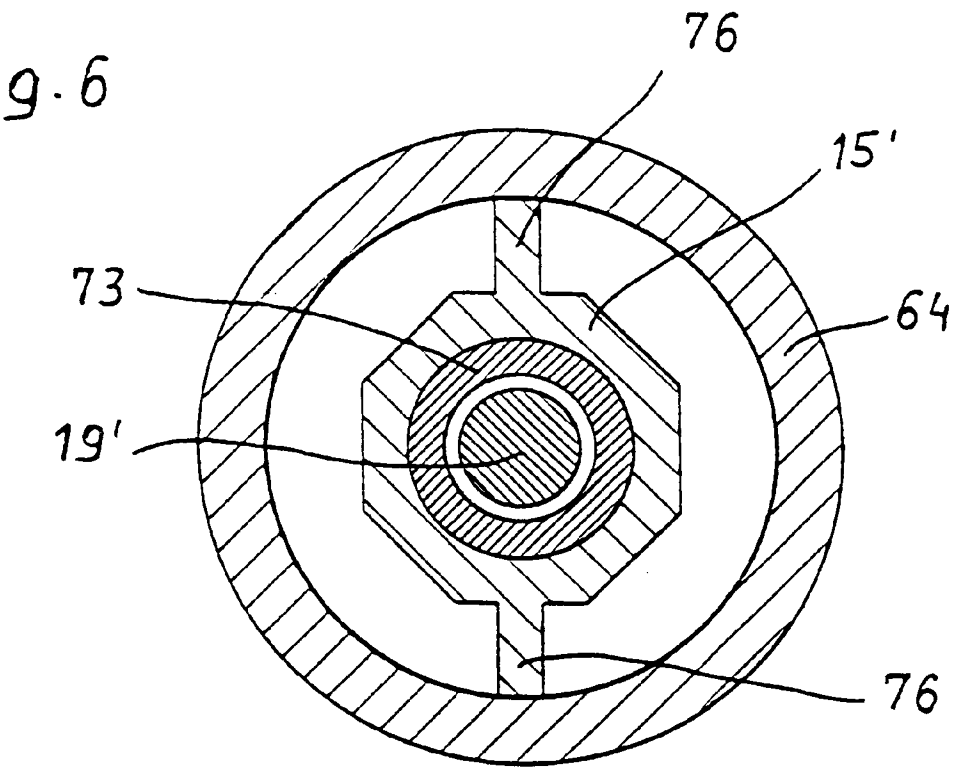
FIG. 6 shows a sectional view through the coolant chamber of the contact part of the anode and FIG. 7 shows a sectional view through the centering sleeve.

As can be seen from FIG. 6, anode 15' is provided with radially projecting guide ribs 76 which extend, as can be seen in FIG. 6, from the one anode 15' having a hexagonal cross section up to the inner wall of the clamping sleeve 64 and stand perpendicular to the axis of the radial duct 47. The guide ribs 76 extend away from the head 70 towards the head 69 of anode 15', with a flow path 77 remaining between head 69 and the guide ribs 76.

In this way the coolant chamber 46, which on its part is delimited by the contact part 63 of the anode and the clamping sleeve 64, is subdivided by the guide ribs 76.

The two coolant chambers 46 of the contact part 45 and the contact part 63 of the anode are mutually connected through a transfer duct 78.

Said transfer duct 78 is substantially composed of axial bores 79 in the contact part 45 or the contact part 63 of the anode and radial bores 80 which are coaxial to the radial ducts 47 and open into the axial bores 79.

Seals 82 are provided in the zone of the bore 81 of the intermediate part 55.

An insert 83 is provided in the orifice zone of anode 15' which is made from a wear-proof material such as a tungsten and cerium oxide alloy.

The two contact parts 45 and 63 are encompassed by rings 84 made of an electrically insulating material, or the same rest on shoulders 85.

As is shown in FIG. 3, the pipe clamp 40 is provided with recesses 86 in the zone of the shoulders 85 of the contact parts 45 and 63 which prevent any short circuits between the two contact parts 45 and 63.

During the operation, gas such as helium, $CO_2$ or the like is blown into the chamber 27' and an arc between the cathode 19' and the anode 15' is ignited by a high-voltage pulse. The plasma thus formed in this way emerges through the nozzle aperture 16'.

Cathode 19' is arranged conically at either of its ends.

The two contact parts 45 and 63 and the intermediate part 55 are mutually connected by means of screws 87 which are shown in FIG. 4 and thus represent the connecting parts which secure a modular arrangement of the plasma producer 11'.

Once cathode 19' has been worn off, the plasma producer 11' which is arranged as a module can be dismounted by loosening the tightening screw 88 and opening the pipe clamp 40, whereupon the tightening nut 49 is loosened and cathode 19' can be removed from the collet. Thereupon the cathode can be turned or its conical ends can be re-ground. Then the cathode can be adjusted by means of a calibre with respect to anode 15'. Then stop 91 is set when the collet 18' is opened and thereafter the cathode 19' is fixed again in the collet 18' by means of the tightening nut 49, whereupon module 11' can be mounted again.

What is claimed is:

1. In combination, a plasma producer and a holder detachably receiving the plasma producer, the plasma producer comprising (a) a non-consumable cathode passing through a chamber and an annular anode having a bore coaxially aligned with the cathode and enclosing an end of the cathode, the cathode end and the annular anode defining a gap therebetween to form a nozzle, the annular anode being conically enlarged adjacent the nozzle, and the nozzle and the chamber being in communication with each other, (b) a holding part made of an electrically well-conducting material holding the cathode in the plasma producer, the holding part and the annular anode being in an electrically conducting connection with separate contact surfaces, (c) an intermediate part made of an electrically insulating material delimiting the chamber, the intermediate part defining the radially extending inlet and having opposite end faces, an end face of the annular anode resting on one of the end faces of the intermediate part and an end face of the holding part resting on the opposite end face of the intermediate part, (d) a pressure part made of an electrically insulating material enclosing the parts, (e) a connecting part holding together the holding part, the anode and the intermediate part forming a module that may be handled as a unit, the connecting part being made of an electrically insulating material enclosing the parts, and (f) a lid screwed on the connecting part and pressing against the pressure part, and the holder comprising (g) a gas supply line extending in an axial direction of the holder substantially perpendicularly to the axis of the cathode and the gas supply line being coaxial with a radially extending inlet of the chamber when the module is received on the holder, (h) contact pins resiliently displaceable in the axial direction of the holder for electrical contact with the electrically conducting contact surfaces of the holding part and the annular anode when the module is received on the holder, (i) electrical connecting lines connected to the contact pins, and (j) detachable fastening means for receiving the module.

2. In the combination of claim 1, the holder comprising a bow for receiving the module, the contact pins engaging radial bores in the connecting part when the module is received in the bow for securing the axial position of the module, and the connecting part having a further radial bore coaxial with the radially extending inlet to the chamber when the module is received on the holder.

3. In the combination of claim 1, a collet holding the cathode and whose receiver is inserted in the holding part, the receiver and holding part defining a first coolant chamber therebetween, the electrically conducting surface of the anode comprising a contact part holding the anode at least indirectly and defining a second coolant chamber, the anode projecting into the second coolant chamber, the cathode passing through the second coolant chamber, the holding part, the intermediate part and the contact part being clamped together in an axial direction in the module, and the coolant chambers having radially extending inlets coaxial with coolant inlet and outlet lines in the holder when the module is received on the holder.

4. In the combination of claim 3, a sleeve made of an electrically insulating material inserted in a continuous axial bore of the anode, the sleeve extending into the chamber delimited by the intermediate part, projecting beyond an end face of the anode and enclosing the cathode with play, and a centering sleeve made of an electrically insulating material inserted in the axial bore of the anode near an opposite end face thereof, the centering sleeve having inwardly facing guide ribs resting on the cathode.

5. In the combination of claim 3, a tungsten alloy insert at the nozzle of the anode.

6. In the combination of claim 3, a head having a substantially conical surface at the nozzle of the anode, and a clamping sleeve having a substantially complementary shaped clamping surface, the clamping sleeve being screwed onto the contact part of the anode for engaging the conical surface, and the clamping sleeve at least partly delimiting the second coolant chamber.

7. In the combination of claim 3, the first and second coolant chambers being interconnected by a duct passing through the intermediate part.

8. In the combination of claim 7, the anode having guide ribs projecting outwardly in a diametric plane up to an inner wall of the second coolant chamber, the guide ribs being arranged between the duct and the radially extending inlets, and extending over a part of the axial extension of the second coolant chamber.

9. In the combination of claim 3, the resiliently displaceable contact pins are hollow pins forming the inlet and outlet lines of the coolant.

10. In the combination of claim 3, a distribution ring arranged in the chamber delimited by the intermediate part, the distribution ring delimiting an annular space about the cathode and being encompassed at least over a part of its outer surface by an annular space defined between the outer surface and an inner wall of the chamber, and the distribution ring having radial bores distributed over the circumference of the distribution ring, the radial bores having different diameters increasing with an increasing angle in the two rotational directions enclosed between the radially extending inlet to the chamber and the axis of each radial bore.

11. In combination, a plasma producer and a holder detachably receiving the plasma producer, the plasma producer comprising (a) a non-consumable cathode passing through a chamber and an annular anode having a bore coaxially aligned with the cathode and enclosing an end of the cathode, the cathode end and the annular anode defining a gap therebetween to form a nozzle, and the nozzle and the chamber being in communication with each other, (b) a holding part made of an electrically well-conducting material holding the cathode in the plasma producer, the holding part and the annular anode being in an electrically conducting connection with separate contact surfaces, (c) an intermediate part made of an electrically insulating material delimiting the chamber, and (d) a connecting part holding together the holding part, the anode and the intermediate part forming a module that may be handled as a unit, and the holder comprising (e) a gas supply line extending in an axial direction of the holder substantially perpendicularly to the axis of the cathode and the gas supply line being coaxial with a radially extending inlet of the chamber when the module i, received on the holder, (f) contact pins resiliently displaceable in the axial direction of the holder for electrical contact with the electrically conducting contact surfaces of the holding part and the annular anode when the module is received on the holder, (g) a bow for receiving the module, the contact pins engaging radial bores in the connecting part when the module is received in the bow for securing the axial position of the module, and the connecting part having a further radial bore coaxial with the radially extending inlet to the chamber when the module is received on the holder, (h) electrical connecting lines connected to the contact pins, and (i) detachable fastening means for receiving the module.

12. In combination, a plasma producer and a holder detachably receiving the plasma producer, the plasma producer comprising (a) a non-consumable cathode passing through a chamber and an annular anode having a bore coaxially aligned with the cathode and enclosing an end of the cathode, the cathode end and the annular anode defining a gap therebetween to form a nozzle, and the nozzle and the chamber being in communication with each other, (b) a holding part made of an electrically well-conducting material holding the cathode in the plasma producer, the holding part and the annular anode being in an electrically conducting connection with separate contact surfaces, (c) an intermediate part made of an electrically insulating material delimiting the chamber, (d) a collet holding the cathode and whose receiver is inserted in the holding part, the receiver and holding part defining a first cooling chamber therebetween, the electrically conducting surface of the anode comprising a contact part holding the anode at least indirectly and defining a second coolant chamber, the cathode passing through the second coolant chamber, (e) a tightening nut having a continuous screw thread, (f) a stop screwed into the tightening nut and projecting into the collet, the cathode resting on the stop and the stop being fixable in position by the nut, (g) a connecting part holding together the holding part, the anode and the intermediate part forming a module that may be handled as a unit, the holding part, the intermediate part and the con tact part being clamped together in an axial direction in the module, and the coolant chambers having radially extending inlets coaxial with coolant inlet and outlet lines in the holder when the module is received on the holder, and the holder comprising (h) a gas supply line extending in an axial direction of the holder substantially perpendicularly to the axis of the cathode and the gas supply line being coaxial with a radially extending inlet of the chamber when the module is received on the holder, (i) contact pins resiliently displaceable in the axial direction of the holder for electrical contact with the electrically conducting contact surfaces of the holding part and the annular anode when the module is received on the holder, (j) electrical connecting lines connected to the contact pins, and (k) detachable fastening means for receiving the module.

* * * * *